United States Patent
Viandier et al.

(10) Patent No.: US 12,338,166 B2
(45) Date of Patent: *Jun. 24, 2025

(54) GLASS-CERAMIC ARTICLE

(71) Applicant: EUROKERA S.N.C., Chateau Thierry (FR)

(72) Inventors: Romain Viandier, La Ferte sous Jouarre (FR); Erwann Luais, Chateau Thierry (FR); Pablo Vilato, Paris (FR)

(73) Assignee: EUROKERA S.N.C., Chateau Thierry (FR)

( * ) Notice: Subject to any disclaimer, the term of this patent is extended or adjusted under 35 U.S.C. 154(b) by 909 days.

This patent is subject to a terminal disclaimer.

(21) Appl. No.: 17/311,424

(22) PCT Filed: Dec. 16, 2019

(86) PCT No.: PCT/EP2019/085310
§ 371 (c)(1),
(2) Date: Jun. 7, 2021

(87) PCT Pub. No.: WO2020/127020
PCT Pub. Date: Jun. 25, 2020

(65) Prior Publication Data
US 2022/0024813 A1    Jan. 27, 2022

(30) Foreign Application Priority Data

Dec. 20, 2018 (FR) ..................... 1873557

(51) Int. Cl.
| C03C 17/00 | (2006.01) |
| C03C 17/30 | (2006.01) |
| C08G 77/00 | (2006.01) |
| C08G 77/04 | (2006.01) |
| C08K 3/34 | (2006.01) |
| C09D 7/40 | (2018.01) |
| C09D 7/61 | (2018.01) |
| C09D 183/04 | (2006.01) |

(52) U.S. Cl.
CPC ......... *C03C 17/009* (2013.01); *C03C 17/002* (2013.01); *C03C 17/007* (2013.01); *C03C 17/30* (2013.01); *C08G 77/04* (2013.01); *C08K 3/34* (2013.01); *C09D 7/61* (2018.01); *C09D 7/69* (2018.01); *C09D 183/04* (2013.01); *C03C 2217/445* (2013.01); *C03C 2217/465* (2013.01); *C03C 2217/475* (2013.01); *C03C 2217/485* (2013.01); *C03C 2218/119* (2013.01); *C03C 2218/32* (2013.01); *C08G 77/80* (2013.01); *C08K 2003/343* (2013.01); *C08K 2201/005* (2013.01)

(58) Field of Classification Search
None
See application file for complete search history.

(56) References Cited

U.S. PATENT DOCUMENTS

| 2004/0004777 A1* | 1/2004 | Takehisa ........... G02F 1/133553 359/883 |
| 2005/0214521 A1 | 9/2005 | Florent et al. |
| 2010/0167035 A1* | 7/2010 | Striegler ............. C03C 17/3405 428/323 |

FOREIGN PATENT DOCUMENTS

| EP | 0437228 A1 | 7/1991 |
| FR | 2868066 A1 | 9/2005 |
| JP | 2004025595 A | 1/2004 |
| JP | 2007530404 A | 11/2007 |
| JP | 2013538171 A | 10/2013 |
| WO | WO-2018167413 A1 | 9/2018 |

OTHER PUBLICATIONS

Henry et al., FR 2868066, Sep. 30, 2005 (machine translation) (Year: 2005).*
Lanxess, Bayferrox 303 T technical datasheet, Feb. 28, 2024 <https://lanxess.com/en-US/Products-and-Brands/Products/b/BAYFERROX—303-T ? (Year: 2024).*
International Search Report issued Mar. 6, 2020 in PCT/EP2019/085310 (with English translation), 5 pages.
Office Action issued Sep. 26, 2023 in Japanese Patent Application No. 2021-533239 (with English translation), 5 pages.
Office Action issued Apr. 2, 2024 in Japanese Patent Application No. 2021-533239 (with English translation), 10 pages.

* cited by examiner

*Primary Examiner* — Cheng Yuan Huang
(74) *Attorney, Agent, or Firm* — Element IP, PLC

(57) ABSTRACT

Article, especially a cooktop or furniture element, containing at least one substrate, such as a plate, made of glass-ceramic, the substrate being coated in at least one zone with paint containing at least: 1) a silicone resin having methyl and phenyl groups, 2) one or more lamellar inorganic fillers with a thickness of less than 2 μm and with lateral dimensions, for at least 80% by weight of the fillers, of between 10 μm and 65 μm, including at least: 2a) mica(s), and 2b) talc and/or one or more carbonates, 3) one or more black pigments. Process for obtaining the article.

15 Claims, No Drawings

GLASS-CERAMIC ARTICLE

The present invention relates to the field of glass-ceramics. More specifically, it relates to a glass-ceramic article (or product) intended in particular to cover or receive heating elements (such as a cooktop, an oven door, a fireplace insert, a fireguard, and the like) and/or intended to act as surface of a piece of furniture (if appropriate, in combination with heating elements in the case, for example, of a central island for a kitchen or dining room). The term "glass-ceramic article" is understood to mean an article based on a substrate made of glass-ceramic material (such as a glass-ceramic plate), it being possible for said substrate, if appropriate, to be provided with additional accessories or elements (decorative or functional) required for its final use, it being possible for the article to denote both the substrate alone and that provided with additional fittings (for example a cooktop provided with its control panel, with its heating elements, and the like).

There exist several commonly used glass-ceramic products, in particular glass-ceramic cooktops, which are encountering great success among household appliance vendors, household electrical appliance manufacturers, and users. This success is explained in particular by the attractive appearance of these tops and by their ease of cleaning.

A glass-ceramic starts out as a glass, referred to as a precursor glass (or parent glass or green glass), the specific chemical composition of which makes it possible, through suitable heat treatments referred to as ceramization treatments, to bring about controlled crystallization. This specific partially crystalline structure confers unique properties on the glass-ceramic.

There currently exist different types of glass-ceramic plates, each variant being the result of major studies and of numerous tests, given that it is very problematic to modify these plates and/or the process by which they are produced without the risk of having an unfavorable effect on the properties desired: in particular, in order to be able to be used as cooktop, a glass-ceramic plate generally has to exhibit a transmission in the wavelengths of the visible region which is both sufficiently low to conceal at least a portion of the underlying heating elements when turned off and sufficiently high for, depending on the situation (radiant heating, induction heating, and the like), the user to be able to visually detect the heating elements in the operating state for the purpose of safety; it should also exhibit a high transmission in the wavelengths of the infrared region in the case in particular of plates having radiant heating elements. Glass-ceramic plates also have to exhibit a sufficient mechanical strength as required in their field of use. In particular, in order to be used as cooktop in the household electrical appliance field or as surface of a piece of furniture, a glass-ceramic plate has to exhibit a good resistance (as defined, for example, according to the standard EN 60335-2-6) to pressure, to impacts (support and fall of utensils, and the like), and the like.

The most widespread current cooktops are dark in color, in particular black in color, but there also exist plates having a lighter appearance (in particular white in color, for example exhibiting a haze of at least 50%, as described in the patent FR 2 766 816), indeed even transparent plates provided with opacifying coatings.

The (functional and/or decorative) coatings known for glass-ceramic plates conventionally include enamels, based on glass frit and on pigments, and certain paints resistant to high temperature, for example based on silicone resins (mainly of silicone alkyd type). Enamels exhibit in particular the advantage of being able to be deposited on the precursor glass (or mother glass or green glass) before ceramization and of being able to be fired during the ceramization and also exhibit the advantage of being able to withstand high temperatures (making possible the use of different heating means for the plate); however, they can locally reduce the mechanical strength of the glass-ceramic plates and can flake off, in particular for very thick deposits or deposits produced in several passes, certain strong colors being in addition difficult to obtain (in particular in a single pass), the firing of the enamels often bringing about the appearance of undesired hues (for example browns or grays for black enamels). In particular, it is difficult to obtain a strong black or white decoration, without interfering hues, at the surface of glass-ceramics by using conventional enamels.

The paint, for its part, can be applied in several layers, if need be, and can exhibit various colors; however, it has to be applied after ceramization and thus requires an additional firing, and it generally remains restricted, in the case of cooktops, to plates for induction burners (operating at lower temperature). In addition, as for the enamels, it is difficult to obtain a strong black or white decoration. In particular, the "deep black" color is very difficult to achieve. In existing formulations based on silicone resin, black pigments are not thermally stable, which can bring about a change in the color and requires in particular providing a high proportion of pigments, the silicone binder being in addition largely absorbed by the pigments, thus creating, in the end, a mechanically brittle paint film which can, as the case may be, split or delaminate under the effect of thermomechanical stresses. Existing black paints which are resistant to high temperature are thus generally not sufficiently black and/or do not sufficiently adhere to the glass-ceramic substrate and/or are not sufficiently resistant to certain thermomechanical stresses desired in the applications targeted in the present invention. In order to minimize these disadvantages or to obtain a stronger color, it is necessary in particular to cover existing paints with an overlayer of paint (in particular a transparent one) and/or of organometallic paste (in particular a black one) or with a layer of resin, these solutions being, however, more expensive and not preventing, as the case may be, the formation of cracks.

There also exist coatings based on reflective layers which make it possible in particular to obtain, by juxtaposition with enamel or paint layers, effects desired for esthetic and/or functional reasons; however, these coatings are generally more expensive as they require a specific installation, their manufacture, carried out off-line after ceramization, is more complex or problematic, and they are restricted, as for the paints, to plates for induction burners (in the case of cooktops).

The aim of the present invention has been to provide a novel glass-ceramic article (in particular a novel glass-ceramic plate intended, for example, to cover or receive heating elements, such as a cooktop, and/or optionally intended to act as surface of a piece of furniture, in combination with, if appropriate, heating elements) based on a substrate made of glass-ceramic, in particular a transparent one, exhibiting, in at least one zone, a coating of strong dark color, which color persists despite the thermomechanical stresses imposed, if appropriate, on said coated substrate, this coating exhibiting a good mechanical strength, heat resistance and abrasion resistance and good persistence, being economical and simple to obtain and adhering sufficiently to the glass-ceramic, while weakening said glass-ceramic as little as possible.

This aim has been obtained by the article (or product) according to the invention, this article being in particular a cooktop or a furniture element (piece of furniture or part of piece of furniture), said article comprising (or being formed of) at least one substrate, such as a plate, made of glass-ceramic, said article and/or said substrate being intended in particular to be used with (in particular to cover or receive) at least one light source and/or at least one heating element and/or being intended to act as surface of a piece of furniture (in combination, if appropriate, with one or more heating elements and/or with one or more light sources), said substrate being coated in at least one zone with a paint comprising (or formed of) at least:

1) a silicone resin comprising methyl and phenyl groups,
2) one or more lamellar inorganic (or mineral) fillers (or charges) with a thickness of less than 2 µm and with lateral dimensions, for at least 80% by weight of said fillers (or D80), of between 10 µm and 65 µm (limits included), including at least: 2a) mica(s), and 2b) talc and/or one or more carbonates,
3) one or more black pigments.

The article according to the invention comprises, or is formed of, at least one glass-ceramic substrate. Preferably, this substrate (or the article itself, if it is formed only of the substrate) is a plate intended in particular to cover or receive at least one light source and/or one heating element. This substrate (or respectively this plate) is generally of geometric shape, in particular rectangular, indeed even square, indeed even circular or oval, and the like, shape, and generally exhibits an "upper" or "external" face (face which is visible or turned toward the user) in the position of use, another "lower" or "internal" face (generally hidden, for example in a framework or casing of the piece of furniture) in the position of use, and an edge face (or edge or thickness). The upper face is generally flat and smooth but may also exhibit at least one protruding zone and/or at least one recessed zone and/or at least one opening, and the like. The lower face is preferentially flat and smooth according to the present invention but might, if appropriate, also exhibit structurings.

The thickness of the glass-ceramic substrate is especially at least 2 mm, in particular at least 2.5 mm, and is advantageously less than 15 mm, especially is of the order of 3 to 15 mm, in particular of 3 to 6 mm. The substrate is preferably a flat or virtually flat plate (especially with a deflection of less than 0.1% from the diagonal of the plate, and preferably of the order of zero).

The substrate can be based on any glass-ceramic, this substrate advantageously exhibiting a zero or virtually zero CTE, especially of less than (in absolute value) $30.10^{-7}$ $K^{-1}$ between 20 and 300° C., in particular of less than $15.10^{-7}$ $K^{-1}$, indeed even of less than $5.10^{-7}$ $K^{-1}$, between 20 and 300° C.

Use is preferably made of a transparent or translucent substrate, in particular based on any glass-ceramic intrinsically having a light transmission TL (integrated in the visible wavelength range) of greater than 50%, especially of between 50% and 90%. The term "intrinsically" is understood to mean that the plate has such a transmission in itself, without the presence of any one coating. The light transmission TL is measured according to the standard NF EN 410 using the illuminant D65 and is the total transmission (integrated in the visible region, between the wavelengths of 0.38 µm and 0.78 µm), taking into account both direct transmission and possible diffuse transmission, the measurement being carried out, for example, using a spectrophotometer equipped with an integrating sphere, the measurement at a given thickness subsequently being converted, if appropriate, to the reference thickness of 4 mm according to the standard NF EN 410.

In particular, use may be made of a transparent glass-ceramic substrate generally comprising crystals of β-quartz structure within a residual vitreous phase and exhibiting an expansion coefficient advantageously of less than or equal to, in absolute value, $15.10^{-7}/°$ C., indeed even $5.10^{-7}/°$ C., this glass-ceramic being, for example, that of the plates sold under the KeraLite name by Eurokera. This glass-ceramic can in particular have a composition as described in the patent applications published under the following numbers: WO 2013171288, US 2010167903, WO 2008065166, EP 2 086 895, JP 2010510951, EP 2 086 896, WO 2008065167, US 2010099546, JP 2010510952 and EP 0 437 228, this glass-ceramic in particular being a lithium aluminosilicate glass-ceramic. If appropriate, this substrate/glass-ceramic can also be colored in its body and/or translucent.

In accordance with the invention, the substrate is provided (or furnished or coated) with a paint (or with a coating made of paint or with one or more layer(s) of paint) as defined according to the invention (the paint being defined by its initial components, its composition being that as applied to the substrate, before, if appropriate, drying and firing) on (or in) one or more zones of at least one face (in particular one of the (upper or lower) main faces) of the substrate, generally its lower or internal face, in particular on most (at least 50%, preferably at least 75%, indeed even at least 90%), indeed even all, of (the surface of) said face, with the exception, if appropriate, of the display devices or display zones (for which any coating or a coating which is less opaque, if appropriate, than the base coating (or predominant coating) of said face is preferred in order to conceal the electronics of said displays when switched off but to allow their light to pass when they are switched on). If appropriate, the paint according to the invention can also be used locally, in order in particular to form decorative and/or functional patterns (for example delimiting heating zones), if appropriate by using a second coating (also formed of a paint according to the invention, for example of different hue or opacity, or optionally formed of another paint or layer of different nature) to cover other parts of the substrate and/or to form a contrast.

Said paint uses, in particular as binder, at least one or more silicone (or polysiloxane) resins selected from resins comprising methyl and phenyl groups, known in particular as "silicone resins of methyl/phenyl type", these resins exhibiting, as organic groups or substituents (or being functionalized by or by the admixture—or the addition or the incorporation—, or being substituted by, or modified by or by the admixture of), methyl and phenyl groups (or functional groups or radicals). The silicone resins of methyl/phenyl type used according to the invention are especially a type of resins in which the organic substituents are essentially or solely composed of methyl and phenyl groups (or functional groups), in contrast to other types of silicone resins, such as silicone resins "of methyl type" (that is to say, in which the organic substituents are composed (only) of methyl groups (and are thus devoid of phenyl groups)) or silicone resins modified by organic resins, such as alkyd, epoxy or polyester resins, denoted in particular by "resins of (modified) epoxy type" (hybridized/modified/substituted by epoxy groups) or "of (modified) alkyd type" (hybridized/modified/substituted by alkyd groups) or "of (modified) polyester type" (hybridized/modified/substituted by polyester groups), and the like. These selected resins according to the invention are especially devoid of (or not functionalized by) one or more of the following groups or functional groups: halogen, epoxy, polyester, alkenyl, vinyl, allyl, alkynyl, mercapto or thiol or acrylic. Preferably, the paint according to the invention comprises, as silicone resins, at least 75% by weight (with respect to the total weight of silicone resins present) of silicone resin(s) of methyl/phenyl type, especially at least 80% and advantageously 100% of silicone resin(s) of methyl/phenyl type. Especially, the paint according to the invention is devoid of silicone resins of (modified) alkyd type and/or of (modified) epoxy type and/or of (modified) polyester type and/or of methyl type.

The silicone resins used can be provided in particular in the form of (co)polymer(s) and/or oligomer(s) which are in particular crosslinkable or, if appropriate, already crosslinked. These resins are advantageously colorless and advantageously exhibit a decomposition temperature of greater than 350° C., especially of between 350° C. and 700° C., and also an average molecular weight (Mw) of especially between 2000 and 300 000 g/mol (or daltons). The silicone resin(s) preferentially used in the paint according to the invention are especially one or more resins chosen from polyphenylmethylsiloxanes (or phenylmethylsiloxane polymer) and/or polydiphenyldimethylsiloxanes (or diphenyldimethylsiloxane polymer), and the like.

Preferably, the content of silicone resin(s) (preferably consisting, essentially or solely, of the resins as selected in the paint according to the invention) is between 20% and 50% by weight, especially between 28% and 40% by weight, of said paint (these contents being given with respect to the total composition as deposited on the substrate and including, if appropriate, a solvent subsequently removed by drying and/or firing) or also is between 30% and 80% by weight of the solids content of the paint.

As defined according to the invention, the paint also comprises one or more inorganic (or mineral) fillers, these fillers not melting in particular during the firing and being insoluble, these fillers having in particular a reinforcing role and also participating in the cohesion and the thermal resistance of the combined product (but contributing only a low opacity and having little effect on the hue, in contrast to pigments), these fillers comprising at least one or more particles of mica(s) and at least one or more particles of talc and/or of carbonate(s) (chosen, for example, from calcium carbonate and/or barium carbonate) of shape (lamellar) and dimensions (thickness of less than 2 µm and lateral dimensions of between 10 µm and 65 µm) as selected according to the invention, the particles of mica(s) contributing more to the mechanical reinforcing and having a smaller impact on the colorimetry than the particles of talc and/or of carbonate (s) in the paint according to the invention and the presence of the two being advantageous according to the present invention. Preferably, the paint according to the invention comprises, as fillers, at least 90% by weight (with respect to the total weight of fillers present) of said mixture of particles of mica(s) and of particles of talc and/or of carbonate(s) of shape and dimensions as selected according to the invention and advantageously 100% by weight of said mixture (in other words, the fillers present are only composed of said or consist solely of said mixture).

These fillers as selected according to the invention are fillers of lamellar shape, that is to say are in the form of platelets which are thin in comparison with their "lateral" dimensions (in the respective plane of the platelets), the thickness of these platelets (or smallest dimension) being, according to the invention, less than 2 µm (for all the particles in particular) and their "lateral" dimensions being, according to the invention, for at least 80% by weight of said particles (D80), of between 10 µm and 65 µm (lower dimensions not preventing in particular the appearance of cracks in the paint composition selected according to the invention), especially of between 10 µm and 60 µm (limits included), it being possible for said platelets, if appropriate, to be locally aggregated by forming aggregates or agglomerates. "Lateral" dimensions is understood to mean, for each platelet, the dimensions in the plane of said platelet (in particular the length (greatest dimension) and the width (greatest dimension perpendicular to the length), this width generally being less than the length (giving a more or less elongated or rectangular platelet shape) but optionally being able to be close to the length (giving an irregular platelet shape falling more or less within a circle)). For the evaluation of these lateral dimensions, the size parameter D80, corresponding to the size of at least 80% by weight of said particles, is considered here, this parameter being evaluated by particle size analysis by particle sizing or laser diffraction according in particular to the standard ISO 13320:2009. The shape of the fillers can in particular be observed by optical microscopy before incorporation in the paint or by scanning electron microscopy (SEM) once in the paint, these fillers being especially obtained by grinding until the selected dimensions are obtained.

The content of fillers as selected in the paint according to the invention is in particular from 5% to 20% by weight and preferentially from 8% to 20% by weight, or also from 1% to 10% (especially from 2% to 10%) by volume, with respect to said paint (total composition as deposited on the substrate and including, if appropriate, a solvent subsequently removed by drying and/or firing). Preferably, the content of talc/carbonate(s) is of between 5% and 15% by weight and the content of mica(s) is of between 3% and 12% by weight.

As indicated above, the paint used according to the invention is also formed of black pigment(s), the content of pigment(s) (preferably consisting of black pigment(s)) being of between 10% and 30% (limits included) by weight of the paint and preferably being from 15% or 20% to 30% by weight of the paint.

The pigments used to prepare the paint are preferably (solely) inorganic pigments and are preferably solely black pigments. They are preferentially chosen from black pigments based on metal oxides, especially based on chromium oxide(s), on copper oxide(s), on iron oxide(s) and/or on manganese oxide(s). Examples of abovementioned pigments are, for example, sold, inter alia, by Kremer under the reference PBk 26.77494 or by Tomatec under the reference 42-303B or by Asahi Sangyo under the reference 3250LM or by Shepherd under the reference Black 430.

The pigments are in particular dispersed in the abovementioned silicone resin(s) (acting as binder, it being possible for the term "silicone binder" also to be used to denote silicone resins) and/or in a medium added (as specified subsequently). The pigments are generally provided in the powder form before being suspended or dispersed in a binder or medium. The pigments are preferentially chosen in the present invention so that at least 50% (by number) and preferably at least 75%, indeed even at least 80%, of the particles of (or forming these) pigments exhibit a size of less than 1 µm, whatever the shape of these particles.

The term "size of a particle" refers to its equivalent diameter, that is to say the diameter of the sphere which would behave identically during the particle size analysis of the particles (or of the powder formed from said particles) forming the pigments under consideration, the particle size distribution (the combined particle sizes) being measured especially by laser particle sizing.

The abovementioned silicone resin(s) coat in particular the pigment powder in the paint and make possible the bulk agglomeration of the particles after drying in order to form the solid paint layer. If appropriate, the paint, in particular in its ready-for-deposition form, also contains, besides the silicone resin(s) binding the pigments, at least one (other) medium or solvent forming part of (or added with) the silicone resin(s) as added to the paint composition and/or forming part of (or added to) the paint, this solvent making possible the achievement of the viscosity desired for the application to the substrate and making possible the prebonding of the paint to the substrate. Use may be made, as solvent, for example, of white spirit (or heavy naphtha), toluene, a solvent of aromatic hydrocarbon type (such as the solvant sold under the Solvesso 100 brand name by Exxon), and the like. The content of solvent in the paint during the deposition is generally of the order of 25% to 45% by weight of the paint, the solvent subsequently being removed in order to obtain the final layer (this removal being carried out in particular during the drying and/or the firing). Preferably, the paint used according to the invention is devoid of water or of aqueous solvent for better use in particular.

The paint can also optionally include other types of components, such as one or more additives chosen in particular from dispersing agents (such as those sold under the reference Dysperbyk-102 or Tego Dispers 689 by Byk or Evonik), air-release additives (such as those sold under the reference Byk A506 or Byk A530 by Byk or Evonik), wetting agents, stabilizing agents, surfactants, pH or viscosity adjusters, biocides, antifoaming agents, antioxidants, siccatives, and the like, at a total content of additives (in addition to the abovementioned silicone binder(s), pigments, fillers and solvent(s)) not exceeding 10%, and especially of between 1% and 10% by weight.

Unlike an enamel composition, the paint composition according to the invention is devoid of glass frit or of components capable of together forming a vitreous matrix. The paint composition according to the invention is provided for the deposition in the form of a dispersion and is also advantageously devoid of silica gel or of colloidal silica for better use of the composition (unlike a hydrolyzate or a sol-gel, it is in particular simpler to form and to use).

In a preferred embodiment according to the invention, the paint according to the invention exhibits the following composition (or comprises the following constituents within the boundaries defined below, limits included), the proportions being expressed as percentages by weight (with respect to the total weight of the ready-for-deposition paint composition):

silicone resin(s) of methyl/phenyl type: 20-50%, preferably 28-40%, black pigment(s): 10-30%, preferably 18-25%, lamellar filler(s) based on mica(s) and on talc and/or carbonate(s): 5-20%, preferably 10-20%, indeed even 15-20%, dispersing agent(s) and air-release agent(s): 1-10%, preferably 2-5%, solvent(s): 25-45%, preferably 28-45%.

The paint coating, once solid, is formed mainly of the abovementioned silicone resin(s), fillers and pigments. The paint before deposition is generally provided in the form of a stable liquid/solid mixture of pasty consistency, the viscosity at deposition of the paint preferentially being between 1000 and 3000 mPa·s, especially between 1300 and 1800 mPa·s.

The paint can be formed directly by mixing its constituents in the required proportions, the viscosity being adjusted, if appropriate, by the addition of the solvent.

The thickness of the final paint coating (once dry) is preferentially between 20 and 40 µm, in particular between 25 and 35 µm.

The solution according to the present invention makes it possible to obtain, in a simple and economical way, without a complex operation (the paint layer being in particular advantageously and simply deposited by screen printing), in a lasting fashion and with great flexibility, the products desired according to the invention. The coating obtained (after drying/firing) is especially deep black and is characterized in particular by an unusually low lightness $L^*$, of less than 5 (the lightness of the existing paints for the applications targeted generally being at least 12), the lightness $L^*$ being a component defined in the CIE colorimetric system and being evaluated in a known way, using in particular a Byk-Gardner Color Guide 45/0 colorimeter (colorimetry in reflection), on the upper face of the substrate (the substrate used for the measurement of lightness of the paint being a transparent glass-ceramic substrate with a thickness of 4 mm intrinsically having a light transmission TL (integrated in the visible wavelength range) of 85-90% and placed on an opaque white background) using the D65 illuminant (the sample being illuminated under an angle of 45° and observed under an angle of 0°). Furthermore, the paint exhibits a good resistance to the normal thermomechanical stresses of glass-ceramics, no discoloration or delamination being observed, in particular in the case of temperature variations of up to 500° C. The paint composition can be used in any zone of the glass-ceramic substrate, even when these zones are subjected to high temperatures and/or to strong illumination. Good adhesion of the paint to the substrate is also observed, this paint additionally exhibiting a good scratch resistance, in particular a resistance to the 2B pencil according to the standard ISO 15184 and a resistance of at least 1N according to the standard ISO 1518-1.

If appropriate, the substrate can comprise one or more additional coatings, in particular localized coatings (for example an enamel on the upper face in order to form logos or simple patterns). Advantageously, the paint as selected coats the substrate according to the invention without the necessity for an overlayer or underlayer.

The article according to the invention can also comprise at least one or more light sources and/or one or more heating elements (such as one or more induction heating means) placed on the lower face of the substrate. The source(s) can be integrated in/coupled to one or more structure(s) of display device(s) type (for example "7-segment" light-emitting diodes), to a touch-sensitive digital-display electronic control panel, to an LCD screen, and the like. The light sources are advantageously formed by light-emitting diodes which are more or less spaced out.

The article according to the invention can comprise, if appropriate, other elements; for example, in the case of a cooking module or of a cooktop, the article can be provided with (or combined with) additional functional or decorative element(s) (frame, connector(s), cable(s), control element(s)), and the like.

The present invention also relates to the process for the manufacture of the articles according to the invention, in which the glass-ceramic substrate is coated with regard to at least one zone with a paint as selected above.

For the record, the manufacture of glass-ceramic plates is generally carried out as follows: the glass with the composition chosen in order to form the glass-ceramic is melted in a melting furnace, the molten glass is then rolled to give a standard ribbon or sheet by causing the molten glass to pass between rolling rolls and the glass ribbon is cut to the desired dimensions. The plates, thus cut, are subsequently ceramized in a way known per se, the ceramization consisting in firing the plates according to the thermal profile chosen in order to convert the glass into the polycrystalline material known as "glass-ceramic", the coefficient of expansion of which is zero or virtually zero and which withstands a thermal shock which can range up to 700° C. The ceramization generally comprises a stage in which the temperature is gradually raised up to the nucleation range, generally located in the vicinity of the range of transformation of the glass, a stage of passing through the nucleation interval in several minutes, a further gradual rise in the temperature up to the temperature of the ceramization stationary phase, the maintenance of the temperature of the ceramization stationary phase for several minutes and then a rapid cooling down to ambient temperature.

The paint selected according to the invention is preferentially applied (in one or more layers, preferably one layer), rapidly and simply, by screen printing (in the form in particular of solid tone(s), with, if appropriate, clear spaces in the display zone) on the glass-ceramic substrate (this deposition being carried out after the optional ceramization of the substrate), advantageously on the lower face of said substrate, in the appropriate zones (with regard to the radiant zone(s), for example).

Preferably, the screen-printing screen used, composed, for example, of fabrics of polyester or polyamide yarns, is chosen so as to exhibit a number of yarns per cm of between 32 and 43 yarns per cm, thus making it possible to obtain a particularly appropriate thickness and definition of the paint coating.

The paint, once deposited, is dried (for example a few minutes at 160° C.) and fired (off-line) on the ceramized substrate, at temperatures of between 350 and 480° C. for from 40 to 60 min approximately, the final paint coating obtained forming a layer based on polymers.

If appropriate, the process also comprises a cutting operation (generally before ceramization), for example using a jet of water, mechanical marking using a cutting wheel, and the like, followed by a shaping operation (grinding, beveling, and the like).

A better understanding of the present invention and its advantages will be obtained on reading the comparative examples which follow, given solely by way of illustration and without limitation, the glass-ceramic substrate used being a transparent substrate as defined in the document EP 0 437 228.

Example 1 according to the invention:
The paint used is prepared by mixing:
30% by weight of silicone resin of methyl/phenyl type sold under the reference RSN-0249 by Dow Corning,
20% by weight of black pigments based on iron and manganese oxide, the size distribution of which is less than 0.5 µm, these pigments being sold under the reference PBk 26.77494 by Kremer,
10% by weight of fillers in the form of (particles of) lamellar micas with a thickness of less than 2 µm, these fillers/mica(s) exhibiting a D80 of 15 µm and being sold under the reference Ronaflair Mica M by Merck,
8% by weight of (fillers in the form of) talc sold by Imerys, these talc particles being of lamellar shape and with a thickness of less than 2 µm and exhibiting a D80 of 30 µm, 1% by weight of dispersant of reference Disperbyk 103 from Byk,
1% by weight of air-release agent of reference Byketol OK from Byk,
30% by weight of solvent of naphtha type sold under the reference Solvesso 100 by Exxon.

The paint is subsequently applied by screen printing with a mesh of reference 32 (32 yarns per cm) to the substrate and then dried at 160° C. for 4 minutes. It is subsequently fired using a heat treatment from 350° C. to 450° C. for 45 minutes.

Example 2 according to the invention:
The paint used is prepared by mixing:
30% by weight of silicone resin of methyl/phenyl type sold under the reference KR-282 by Shin-Etsu,
20% by weight of black pigments based on copper, chromium and manganese oxide, the size distribution of which is 0.6 µm, these pigments being sold under the reference 42-303B by Tomatec,
10% by weight of fillers in the form of particles of lamellar micas with a thickness of less than 2 µm and exhibiting a D80 of 60 µm, sold under the reference Iriodin 600 by Merck,
8% by weight of (fillers in the form of) talc sold by Imerys, these talc particles being of lamellar shape and with a thickness of less than 2 µm and exhibiting a D80 of 30 µm,
1% by weight of dispersant of reference Disperbyk 103 from Byk,
1% by weight of air-release agent of reference Byketol OK from Byk,
30% by weight of solvent of naphtha type sold under the reference Solvesso 100 by Exxon.

The paint is subsequently applied by screen printing with a mesh of reference 32 to the substrate and then dried at 160° C. for 4 minutes. It is subsequently fired using a heat treatment from 350° C. to 450° C. for 45 minutes.

Reference example 1 not in accordance with the invention:
The paint used is prepared by mixing:
35% by weight of silicone resin of methyl/phenyl type sold under the reference RSN-0249 by Dow Corning,
25% by weight of black pigments based on copper, chromium and manganese oxide, the size distribution of which is 0.6 µm, these pigments being sold under the reference 42-303B by Tomatec,
8% by weight of (fillers in the form of) talc sold by Imerys, these talc particles being of lamellar shape and with a thickness of less than 2 µm and exhibiting a D80 of 8 µm,
1% by weight of dispersant of reference Disperbyk 103 from Byk,
1% by weight of air-release agent of reference Byketol OK from Byk,
30% by weight of solvent of naphtha type sold under the reference Solvesso 100 by Exxon.

The paint is subsequently applied by screen printing with a mesh of reference 32 to the substrate and then dried at 160° C. for 4 minutes. It is subsequently fired using a heat treatment from 350° C. to 450° C. for 45 minutes.

Reference example 2 not in accordance with the invention:
The paint used is prepared by mixing:
35% by weight of silicone resin of methyl type sold under the reference KR-220L by Shin-Etsu, 20% by weight of black pigments of reference PBk 26.77494 sold by Kremer, based on iron and manganese oxide, the size distribution of which is less than 0.5 µm, 13% by weight of (fillers in the form of) talc sold by Imerys, these talc particles being of lamellar shape and with a thickness of less than 2 µm and exhibiting a D80 of 8 µm, 1% by weight of dispersant of reference Disperbyk 103 from Byk, 1% by weight of air-release agent of reference Byketol OK from Byk, 30% by weight of solvent of naphtha type sold under the reference Solvesso 100 by Exxon.

The paint is subsequently applied by screen printing with a mesh of reference 32 to the substrate and then dried at 160° C. for 4 minutes. It is subsequently fired using a heat treatment from 350° C. to 450° C. for 45 minutes.

A sample of each glass-ceramic provided with each paint is subsequently placed on a heating element. The temperature measured at the coating is 260° C. (corresponding to the temperature experienced by the coating during the cooking of food of sausages type). Several heating cycles of 15 minutes at 260° C., followed by cooling down to ambient temperature, are subsequently carried out (total duration of each cycle of 20 minutes).

It is observed that the paint in the examples according to the invention withstands at least 1500 heating cycles without splitting or exhibiting cracks or delaminating, whereas, in the reference comparative examples, the paint splits/exhibits cracks and delaminates after 100 cycles. Furthermore, the paint of the examples according to the invention is particularly black (with an L*<5) and adheres well to the glass-ceramic substrate, the scratch tests according to the standards ISO 15184 and ISO 1518-1 respectively giving a resistance to a 2B pencil and a resistance to a force of at least 1N.

The articles, in particular plates, according to the invention can in particular be used with advantage to produce a novel range of cooktops for kitchen ranges or cooking surfaces or a novel range of work tables, consoles, central islands, and the like.

The invention claimed is:

1. An article, comprising at least one substrate made of glass-ceramic, said substrate being coated in at least one zone with a paint comprising:
   1) 20-50 wt. %, based on a total weight of said paint, of a silicone resin comprising methyl and phenyl groups;
   2) 5-20 wt. %, based on the total weight of said paint, of one or more lamellar inorganic fillers with a thickness of less than 2 µm and with lateral dimensions, for at least 80% by weight of said fillers, of between 10 µm and 65 µm, including at least: 2a) mica, and 2b) talc and/or one or more carbonates; and
   3) 10-30 wt. %, based on the total weight of said paint, of one or more black pigments.

2. The article as claimed in claim 1, wherein the silicone resin(s) of said paint are devoid of one or more functional groups selected from the group consisting of: halogen, epoxy, polyester, alkenyl, vinyl, allyl, alkynyl, mercapto, thiol, and acrylic, and are especially one or more polyphenylmethylsiloxane resins and/or one or more polydiphenyldimethylsiloxane resins.

3. The article as claimed in claim 1, wherein said paint comprises, as silicone resins, at least 75% by weight of silicone resin(s) of methyl/phenyl type, with respect to the total weight of silicone resins present, and
   wherein said paint is devoid of silicone resins of alkyd type and/or of epoxy type and/or of polyester type and/or of methyl type.

4. The article as claimed in claim 1, wherein the content of silicone resin(s) is between 28% and 35% by weight of said paint.

5. The article as claimed in claim 1, wherein the content of said lamellar fillers is from 8% to 20% by weight with respect to said paint.

6. The article as claimed in claim 5, wherein a content of talc/carbonate(s) is between 5% and 15% by weight of the paint and a content of mica is between 3% and 12% by weight of the paint.

7. The article as claimed in claim 1, wherein the content of the one or more black pigments is between 15% and 30% by weight of the paint, and
   wherein at least 50% of the particles of black pigments exhibit a size of less than 1 µm.

8. The article as claimed in claim 7, wherein at least 75% of the particles of pigments exhibit a size of less than 1 µm.

9. The article as claimed in claim 7, wherein at least 80% of the particles of pigments exhibit a size of less than 1 µm.

10. The article as claimed in claim 1, wherein a thickness of the paint coating is between 20 and 40 µm.

11. The article as claimed in claim 1, wherein the paint coating exhibits a lightness L* of less than 5.

12. The article as claimed in claim 1, wherein the article is a cooktop or a furniture element.

13. The article as claimed in claim 1, wherein the silicone resin(s) are at least one selected from the group consisting of polyphenylmethylsiloxane resin(s) and polydiphenyldimethylsiloxane resin(s).

14. The article as claimed in claim 1, wherein said paint comprises, as silicone resins, at least 80% by weight of silicone resin(s) of methyl/phenyl type, with respect to the total weight of silicone resins present, and
   wherein said paint is devoid of silicone resins of alkyd type and/or of epoxy type and/or of polyester type and/or of methyl type.

15. The article as claimed in claim 1, wherein the paint comprises:
   1) 20-35 wt. %, based on a total weight of said paint, of a silicone resin comprising methyl and phenyl groups;
   2) 5-20 wt. %, based on the total weight of said paint, of one or more lamellar inorganic fillers with a thickness of less than 2 µm and with lateral dimensions, for at least 80% by weight of said fillers, of between 10 µm and 65 µm, including at least: 2a) mica, and 2b) talc; and
   3) 10-30 wt. %, based on the total weight of said paint, of one or more black pigments.

* * * * *